(12) United States Patent
Blach

(10) Patent No.: US 7,703,970 B2
(45) Date of Patent: Apr. 27, 2010

(54) ILLUMINATED BACKGROUND DISPLAY APPARATUS

(75) Inventor: Tomasz Blach, Eagleby (AU)

(73) Assignee: Sotek Australia Pty Ltd (AU)

( * ) Notice: Subject to any disclaimer, the term of this patent is extended or adjusted under 35 U.S.C. 154(b) by 67 days.

(21) Appl. No.: 11/254,336

(22) Filed: Oct. 20, 2005

(65) Prior Publication Data

US 2006/0039166 A1  Feb. 23, 2006

Related U.S. Application Data

(63) Continuation-in-part of application No. 10/473,086, filed on Sep. 26, 2003, now abandoned.

(30) Foreign Application Priority Data

Mar. 27, 2001 (AU) .................................... PR0411
Mar. 27, 2002 (WO) .................... PCT/AU02/00379

(51) Int. Cl.
*F21V 8/00* (2006.01)

(52) U.S. Cl. ................ 362/609; 362/561; 362/612; 362/613; 362/555

(58) Field of Classification Search ................ 362/609, 362/812, 606, 612, 613, 618, 628, 629, 561, 362/554, 555, 27
See application file for complete search history.

(56) References Cited

U.S. PATENT DOCUMENTS

| | | | | |
|---|---|---|---|---|
| 4,519,017 A | * | 5/1985 | Daniel | 362/565 |
| 4,542,960 A | * | 9/1985 | Yang | 349/141 |
| 4,650,998 A | * | 3/1987 | Martin | 250/239 |
| 4,729,068 A | * | 3/1988 | Ohe | 362/615 |
| 5,021,928 A | * | 6/1991 | Daniel | 362/556 |
| 5,038,260 A | * | 8/1991 | Scheibengraber | 362/268 |
| 5,079,675 A | * | 1/1992 | Nakayama | 362/613 |
| 5,375,043 A | | 12/1994 | Tokunaga | |
| 5,641,225 A | * | 6/1997 | Katoh et al. | 362/347 |

(Continued)

FOREIGN PATENT DOCUMENTS

EP  0 751 340 A  1/1997

(Continued)

OTHER PUBLICATIONS

Machine translation from Japanese of JP 2001043718, Citizen Electronics, Surface Light Source Unit and Liquid Crystal Display Device Using the Same.*

(Continued)

*Primary Examiner*—Sharon E Payne
(74) *Attorney, Agent, or Firm*—Cantor Colburn LLP

(57) ABSTRACT

An illuminating display including a transparent substrate in the form of a sheet or slab having an upper face, a lower face and a plurality of edge faces. The edge faces are provided with an internally reflective treatment and at least one light source associated with the substrate, causing a relatively narrow beam of light rays to emanate into said substrate. At least one reflective surface arranged internally of said substrate to operatively internally reflect light rays from said at least one light source within the substrate. Either (or both) the upper face and the lower face having material in contact therewith for directing light from within the substrate out of a face. The display may be employed in combination with a liquid crystal display (LCD) assembly.

26 Claims, 6 Drawing Sheets

U.S. PATENT DOCUMENTS

| | | | |
|---|---|---|---|
| 5,947,578 A | | 9/1999 | Ayres |
| 6,001,210 A | | 12/1999 | Ayres |
| 6,167,182 A | * | 12/2000 | Shinohara et al. ............ 385/129 |
| 6,375,335 B1 | * | 4/2002 | Tabata et al. ................. 362/612 |
| 6,575,584 B1 | * | 6/2003 | Habraken .................... 362/609 |
| 6,647,199 B1 | * | 11/2003 | Pelka et al. .................. 385/146 |
| 6,991,357 B2 | * | 1/2006 | Wimbert et al. .............. 362/603 |

FOREIGN PATENT DOCUMENTS

| | | |
|---|---|---|
| JP | 10-199318 | 7/1998 |
| JP | 11-143377 | 5/1999 |
| JP | 2001-043718 | 2/2001 |

OTHER PUBLICATIONS

European Search Report for Application No. EP 02 70 6546 dated Jun. 30, 2005.

* cited by examiner

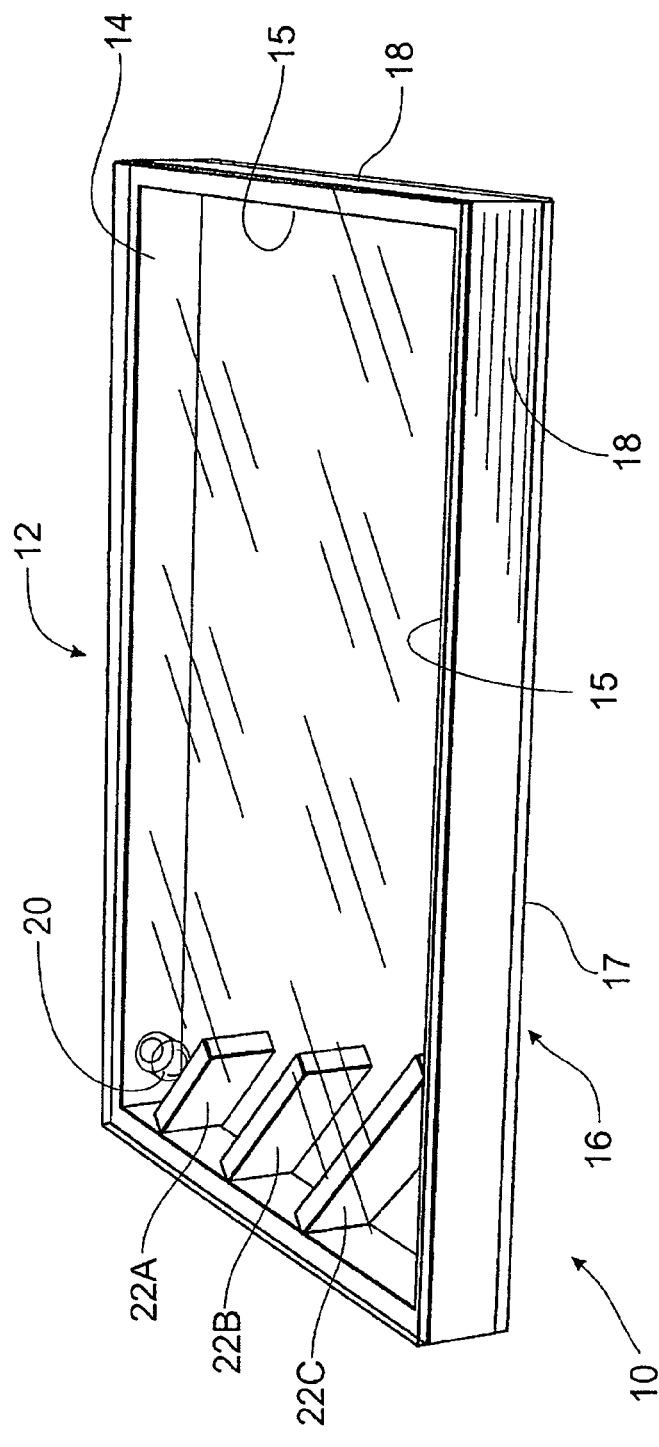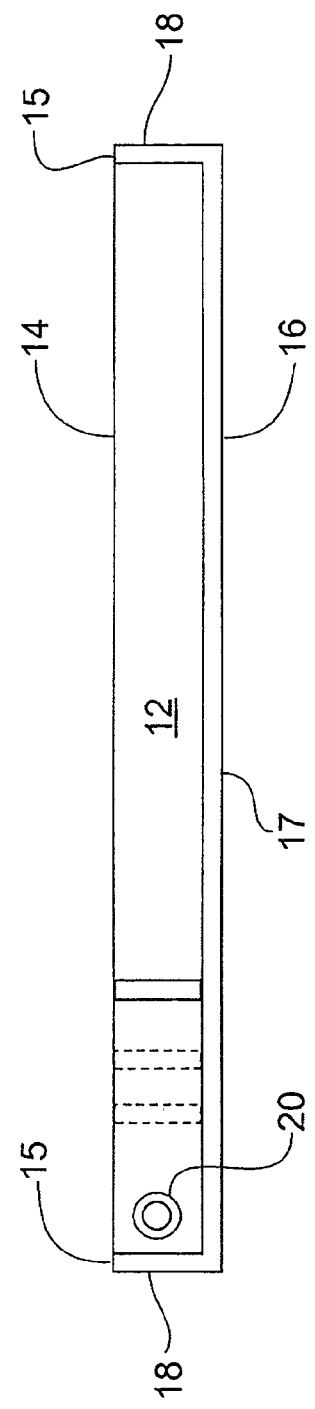

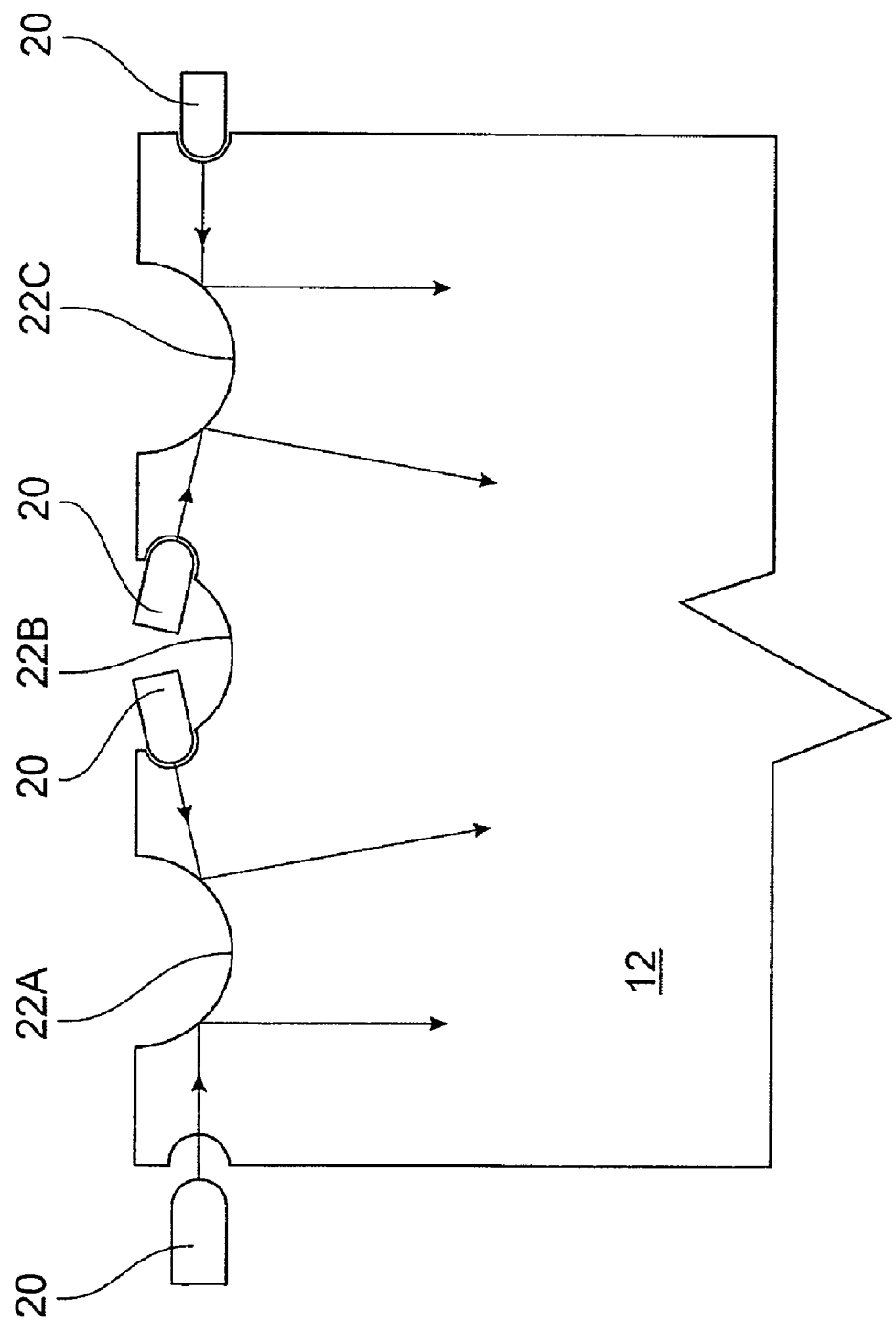

ILLUMINATED BACKGROUND DISPLAY APPARATUS

CROSS REFERENCE TO RELATED APPLICATION

This application is a continuation-in-part of U.S. patent application Ser. No. 10/473,086 filed on Sep. 26, 2003, now abandoned the contents of which are herein incorporated by reference in their entirety.

BACKGROUND OF THE INVENTION

1. Field of the Invention

The present invention is concerned with an illuminated display apparatus. The invention finds particular, although not exclusive, application as a means for back-lighting liquid crystal displays (LCDs).

2. Discussion of the Background Art

Back-illuminated flat panels have typically incorporated either an edge located light batten or a straight fluorescent tube positioned along the length of an edge of the panel. Prior art arrangements of the above type that use linear light sources are disclosed in U.S. Pat. No. 5,219,217 to Aikens and European Patent Publication No. 879991 in the name of Matsushita Electric Industrial Co., Ltd. for example.

Such illuminated panels are characterised by the use of reflective surfaces provided either adjacent to or within the panel, which surfaces are arranged to reflect light from the linear source out through a major surface of the panel towards an observer. Typically reflective surfaces are arranged with an axis parallel to both the linear light source and a major panel surface to maximise reflection of light scattered from the light source. However, such prior art illumination arrangements suffer from the disadvantage that grooves are positioned in the line of sight of the viewer, thus further diffusive stage such as Fresnel lens must be added to the assembly, as for example in European Patent Publication No. 879991.

Back-illuminated flat panels find particular application for back-lighting LCD displays such as find application in lap-top computers, handheld televisions, video camera viewfinders and like devices. Such devices are usually battery powered and so it is particularly important that the display consumes a minimum of power.

In order to minimise power consumption prior art designs have incorporated Fresnel lenses into their design thereby maximising visibility of the display from a location perpendicular to the screen. A serious problem with this approach however is that visibility may be critically reduced when the screen is viewed from an off-perpendicular position.

SUMMARY OF THE INVENTION

Object of the Invention

It is an object of the present invention to provide a back-illuminated flat panel which is an alternative to those known in the prior art and which has relatively low power consumption.

It is a further object of the present invention to provide a back-lit liquid crystal display assembly which reduces the previously identified problems.

Disclosure of the Invention

According to one aspect of the present invention there is provided an illuminating display including:

a transparent substrate in the form of a sheet or slab having an upper face, a lower face and a plurality of edge faces;

the plurality of edge faces provided with an internally reflective treatment;

at least one light source associated with the substrate, causing a relatively narrow beam of light rays to emanate into said substrate;

a plurality of reflective surfaces arranged internally of said substrate to operatively internally reflect light rays from said at least one light source within the substrate; and at least one of the upper face and the lower face having light capturing material in contact therewith for directing internally reflected light outwardly of the substrate.

Preferably, the reflective surface extends laterally of the upper and lower faces of the sheet. Most preferably, the reflective surface is perpendicular to said at least one of the upper face and the lower face of the substrate.

Preferably the reflective surface is formed by an air-gap arranged to operatively internally reflect light rays from said at least one light source.

Suitably the relatively narrow beam of light is directed towards one or more of said plurality of edge faces. Desirably, the beam is sufficiently narrow such that any light rays incident on either the upper face or the lower face are substantially internally reflected other than where said face is contacted by the light capturing or directing material.

The substrate may have parallel upper and lower surfaces as required.

In one form, a white material is in contact with the entire lower surface of the substrate for directing light from within the substrate towards the upper surface of the substrate.

In an alternative form, white material is in contact with selected portions of the lower surface for directing light in a predetermined configuration towards the upper surface of the substrate. Suitably, the predetermined configuration forms a sign.

According to a further embodiment of the invention a plurality of air-gaps are included in said panel located at different positions in order to reflect light rays operatively emanating from said at least one light source over a range of angles.

The transparent substrate may be any one of clear acrylic, glass or polyethylene. Other materials will also be suitable.

Preferably a face of the transparent substrate is treated with a dispersive material.

The dispersive material may be a translucent film that allows light to be transmitted through it from the transparent substrate, but masks the internal structure of the substrate.

The light source may be a light emitting diode or a laser diode. A preferred light source is a gallium nitride ultra-high brightness light emitting diode. An alternative source of light is an optical fibre.

The air-gaps may be made by cutting incisions into the edge of the substrate or alternatively the air-gaps may be pre-formed such as by moulding.

The reflective surfaces may be flat or alternatively they may be curvilinear or parabolically shaped. The surfaces may be arranged to abut each other thereby forming a V cross section.

The light source may be partially covered by a reflective material in order to prevent viewing of a body of the light source from a point external to the display.

According to a further aspect of the present invention there is provided an illuminating panel in combination with a liquid crystal display assembly.

Suitably, substantially the entire lower face of the substrate is in contact with a white material for directing light from within the substrate towards the upper surface of the substrate, which upper surface is associated with the LCD assembly.

The above combination may be incorporated into an appliance such as a computer, television, video camera or the like.

According to a still further aspect of the invention there is provided an illuminating display including:

a transparent substrate having a viewing face;

at least one light source located within said substrate producing a relatively narrow beam of light rays;

at least one reflective surface arranged perpendicular to the viewing face to operatively internally reflect light rays from said at least one light source; and at least one face of the substrate having material in contact therewith for directing internally reflected light from within the substrate to illuminate a selected portion of the substrate.

Suitably the substrate is shaped as a sheet or a slab, preferably with parallel major viewing faces. Alternatively the substrate may be amorphous.

Most preferably said at least one reflective surface is provided by an air-gap.

BRIEF DETAILS OF THE DRAWINGS

In order that this invention may be more readily understood and put into practical effect, reference will now be made to the accompanying drawings which illustrate preferred embodiments of the invention and wherein:

FIG. 1A is a perspective view of a background display apparatus according the a first embodiment of the present invention;

FIG. 1B is a front elevational view of the apparatus of the first embodiment;

FIG. 1C is a front elevational view of a variation of the first embodiment of FIG. 1B;

DESCRIPTION OF PREFERRED EMBODIMENTS

Figure 2:
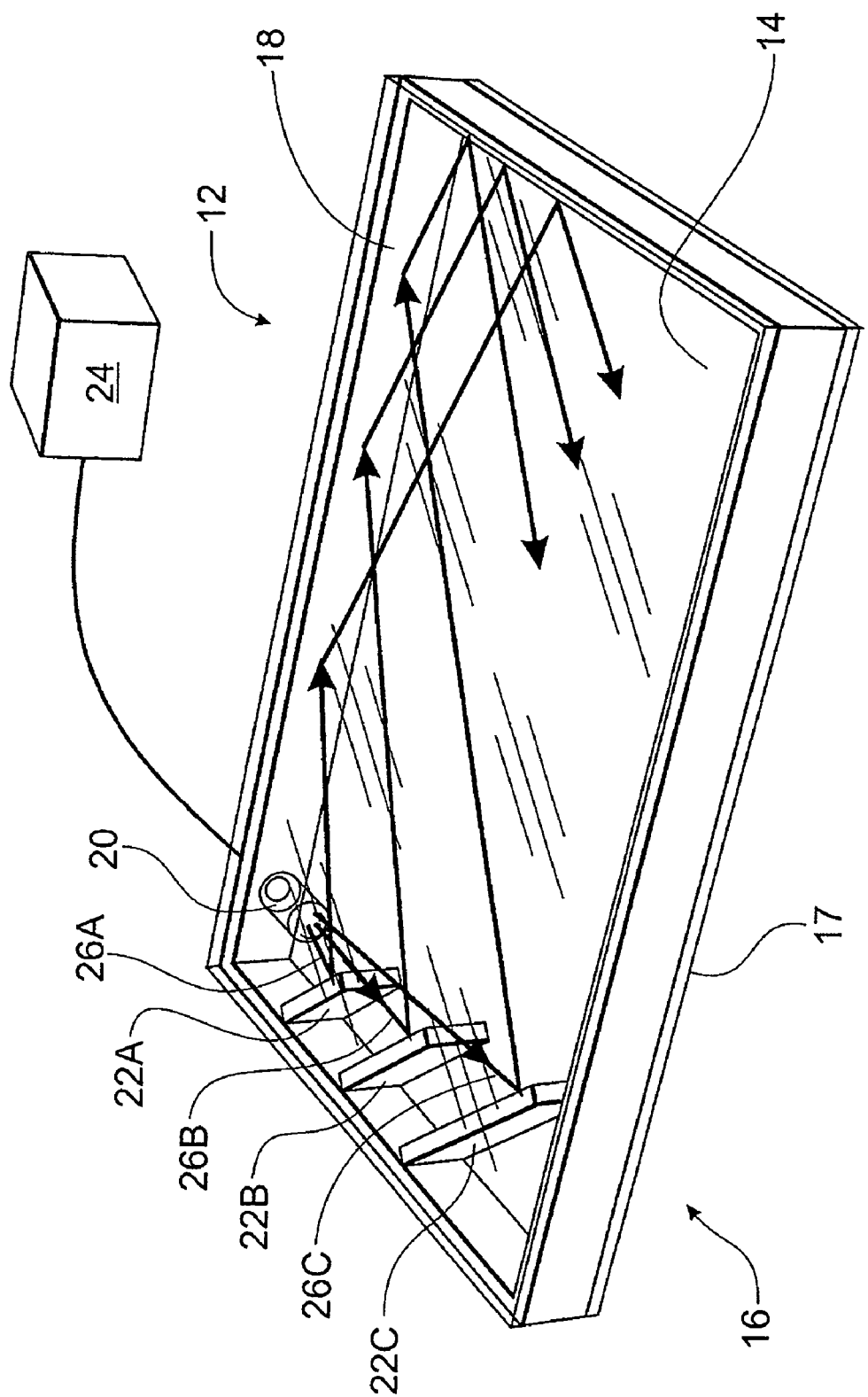
FIG. 2 depicts the apparatus of FIG. 1 in use.

Referring now to FIGS. 1A and 1B, there is depicted a display apparatus 10 according to an embodiment of the present invention. The display apparatus includes a substrate formed by single slab or sheet 12 of optically transparent material. Any stable, optically transparent material having a refractive index greater than air will be suitable. For example, clear acrylic, glass and polyethylene are all suitable. Although shown as having a rectangular form, the substrate could be formed in any desired shape. The sheet 12 has parallel upper 14 and lower 16 faces as shown. In the example depicted there are four edge faces 15, each of which is treated with an inwardly reflecting mirror coating 18.

For use as a back-light source the lower face 16 of sheet 12 is in contact with a white material 17 so that no air-gap is present between the material and the lower face of the sheet. The white material 17 operates to capture light from sources within sheet 12 and to reflect the light forward towards the upper face 14 of the sheet 12. The material 17 contacting the lower face substantially reduces internal reflection from said lower face 16 of the sheet 12. White material 17 does not have to fully cover the lower surface of sheet 12. It may be non-continuous in order to produce a visible pattern, such as the word EXIT for a sign (see FIG. 7A).

The upper face 14 of sheet 12 may be treated with a dispersive material, such as covering with a translucent sheet or a diffusive grating to hide the internal structure of the substrate.

A light source 20 is housed in a hollow in the sheet 12, such that a relatively narrow beam of light rays emanate within the substrate. Suitable light sources include LEDS, since they produce a beam with around only 8° of dispersion and facilitate direct control of brightness. Brightness control allows use of the invention in environments varying from caves to ambient sunlight. Other light sources such as laser diodes might be used. Optical fibres may also be employed.

In the presently described and preferred embodiment, the light source consists of gallium nitride ultra-high brightness lights emitting diode (GaN LED). GaN LEDs generate a light that is typically concentrated in a bright and narrow beam. Such a source has hitherto been difficult to use for back-lighting purposes.

A number of rectilinear air-gaps 22A, 22B, 22C are made in the sheet 12, commencing from an edge face adjacent to the light source 20. The air-gaps provide reflective surfaces that extend laterally of the major faces 14, 16 of the sheet 12. It is by far most convenient that the gaps be filled with air however another substance with a refractive index lower than sheet 12 might also fill each of the gaps. The plane of each of the air-gaps is at right-angles to both the upper face 14 and lower face 16. The normal of the plane of each of the air-gaps makes an angle less than the critical angle with a ray from light source 20.

Alternatively, a number of semi-circular or rounded air-gaps 23A, 23B, 23C are made in the sheet 12 commencing from an edge face adjacent to the light source 20 as shown in FIG. 1C. These air-gaps also provide reflective surfaces extending laterally of the major faces 14, 16 and 12 of the sheet. By having the plane of the air-gaps perpendicular to the upper and lower faces, the light is reflected by the air-gaps 23A, 23B, 23C through the substrate 12. In this way light is reflected from the edge faces 15 to scatter and distribute the illumination before exiting through faces 14 or 16.

Additionally, light sources can be fitted into these air gaps to further promote light scatter.

The orientation of the air-gaps is arranged to cause light rays from the light source to be partially reflected inside the panel without altering the angle of the rays, when reflected, relative to the upper and lower faces of sheet 12. The sides of each air-gap may be flat or round and polished, making an angle in the range of 60-120 degrees with an incident beam from light source 20. Preferably, this angle is approximately 120 degrees. As will be described further later, the air-gaps may have walls which have a shallow parabolic or semi-circular shape as viewed from the upper or lower surface of sheet 12. A shallow parabolic shape is preferred. Where a parabolic shape is used the focus of each parabolic shape is the light source 20.

It will be noted that in the embodiment shown in FIGS. 1A and 1B, each of the air-gaps protrudes further into sheet 12 than the next closest air-gap to the light source. Consequently air-gaps further from the light source reflect rays that have missed closer air-gaps. While three air-gaps are shown in FIGS. 1A 1B and 1C, the invention would work with fewer or more reflective surfaces, herein the form of air-gaps.

Additionally, the air gaps 22 may be formed to contain further light sources 20 especially for lengthy light displays.

Referring now to FIG. 2, upon connecting a power source 24 to light source 20, exemplary light rays 26A, 26B, 26C are emitted from the light source and reflected from each of the sheet-air interfaces formed by air-gaps 22A, 22B, 22C by virtue of internal reflection. The beams proceed to be further reflected by edge reflector 18 and internally reflected by upper face 14. Upon the rays becoming incident with white material 17 on the lower face 16 they are diffused so that some of the light rays are reflected to the upper face 14 and transmitted through it without being internally reflected.

To enhance the effect, a photo-luminescent (fluorescent) coating material may be used to coat the lower face 16 to amplify the light. Another option is to use a blue or ultraviolet (UV) LED and use rare-earth based fluorescent dies to cover the lower face 16 of the sheet 12 in order to achieve light amplification and desired colour of emitted light. Alternatively, white material 17 may incorporate a fluorescent or photo-luminescent material in order to amplify the illuminating effect when the upper face 14 is viewed.

Figure 7A:
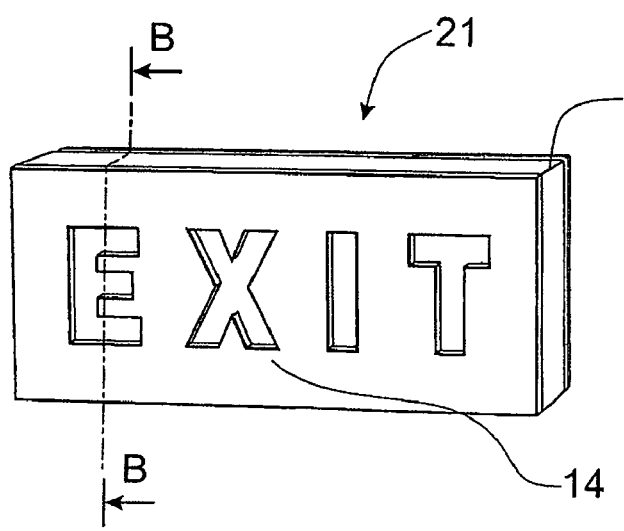
FIG. 7A is a perspective view of an exit sign according to a still further embodiment of the present invention.
Figure 7B:
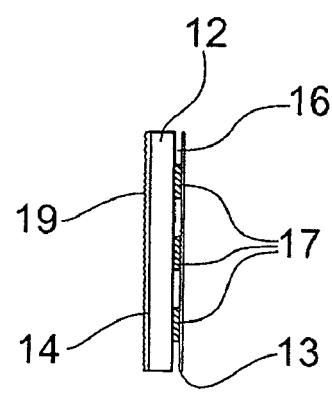
FIG. 7B is a sectional side elevational view on B-B of the exit sign of FIG. 7A.

In another embodiment depicted in FIGS. 7A and 7B, the white material 17 may be provided on only predetermined portions of the lower face 16, thereby producing a sign 21 (here the word "EXIT") or advertisement which will be visible when upper face 14 is viewed. The upper face in this embodiment is treated with a dispersant material 19, such as a micro-grooved coating to reflect a small amount of light onto the uncontacted portions of the lower face 16. This provides a contrasting low light level for the portions of the sign surrounding the brightly lit word EXIT. In the embodiment depicted, a support member 13 for the white material 17, is otherwise reflective, such as including a covering of reflective material. However, this support member 13 may alternatively be translucent dispersive material allowing viewing from the lower face 16 of the sheet 12. It will be appreciated that both the upper 14 and lower 16 faces may be arranged in this way to provide a double-sided sign.

Figure 3:
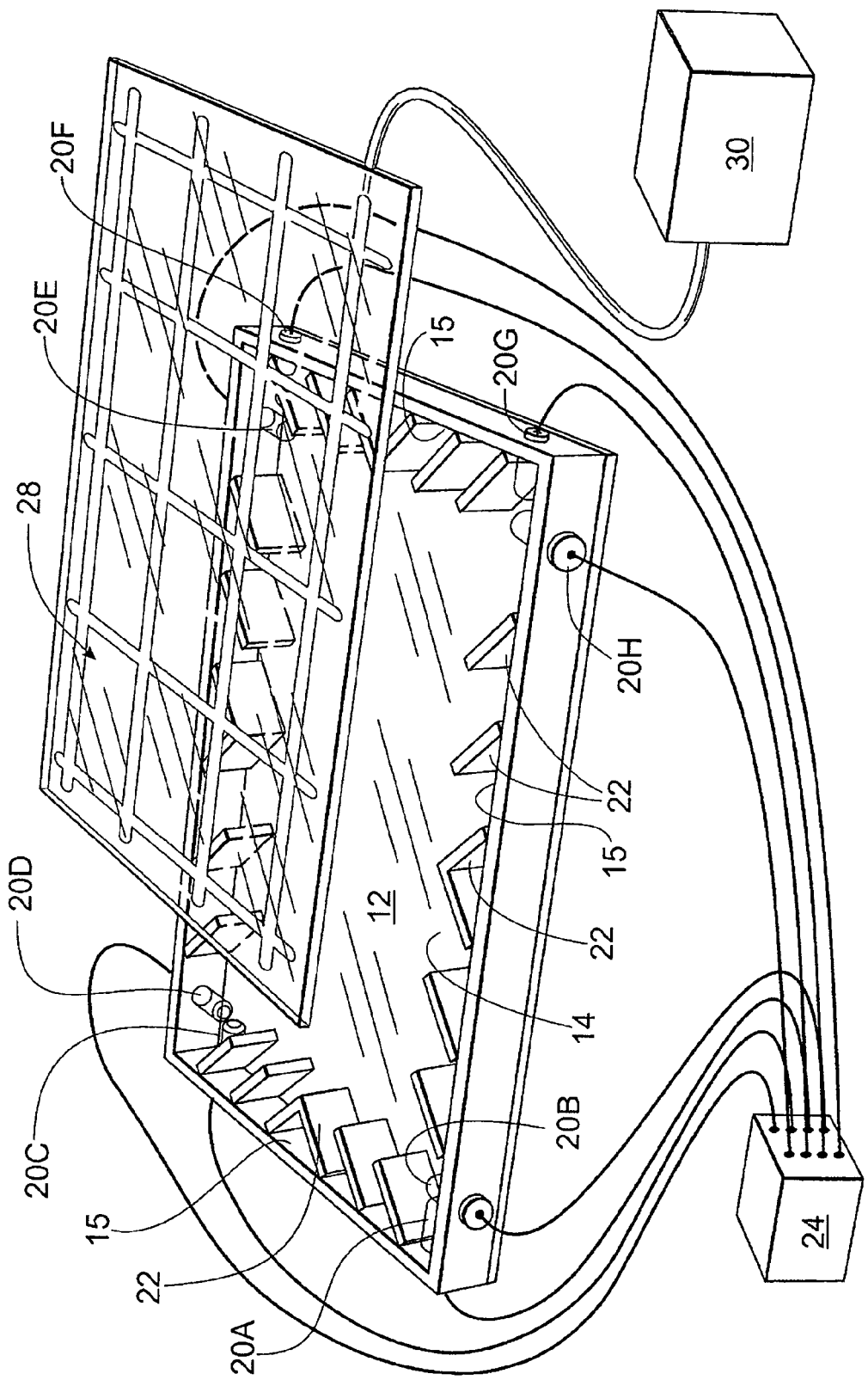
FIG. 3 is a partially exploded perspective view of a back-lit liquid crystal display according to a second embodiment of the present invention.

Referring now to FIG. 3 there is shown an exploded view of a backlit LCD assembly incorporating a panel according to an embodiment of the present invention. FIG. 3 depicts a panel wherein two light sources, in the form of GaN LEDs 20A-20H have been incorporated into each corner of slab 12 as shown. Air-gaps 22 are located along each edge face 15 of sheet 12 in order to internally reflect light from each of the LEDs. An LCD film 28, shown in exploded view relative to sheet 12, is mounted upon the upper face 14 of sheet 12.

The LEDs 20A-20H are each operatively connected to a power supply 24 for their energisation. LCD sheet 28 is operatively connected to a video controller circuit 30 such as might be found in a lap-top computer, hand-held television or video camera for example.

In use, rays from each of the LEDs 20A-20H are internally reflected by air-gaps 22 and dispersed from white backing material 17 out of upper face 14 as previously described and thence through transparent portions of LCD sheet 28.

Accordingly the LCD display sheet 28 is consequently back-lit and readily viewable from above. Furthermore, because the arrangement of FIG. 3 does not make use of Fresnel lenses, the light transmitted through the LCD is not substantially collimated. Consequently, the LCD sheet 28 appears back-lit when viewed over a large range of angles to the normal to the sheet 12.

The arrangement of FIG. 3, including eight GaN LEDs typically consumes about 0.6 Watts of electrical energy. In contrast a typical lap-top computer LCD display consumes power at almost ten times that rate.

Figure 4:
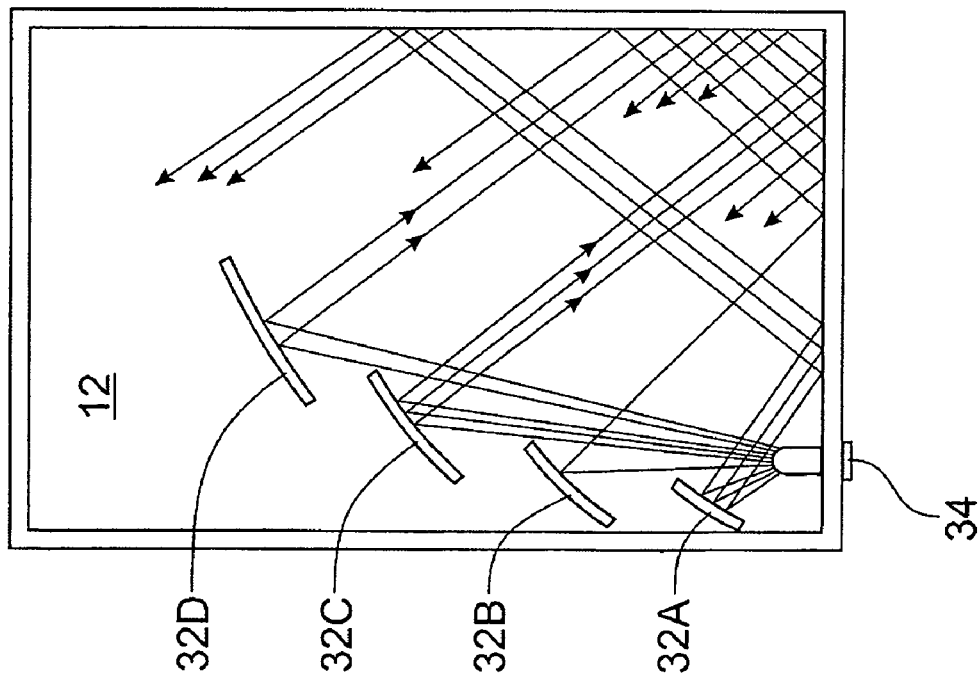
FIG. 4 is a top plan view of a background display apparatus according to a further embodiment of the invention.

With reference to FIG. 4, there is shown a further embodiment of the invention wherein air-gaps 32A-32D shaped as portions of a shallow parabola have been used to internally reflect light rays from light source 34. The parabola shaped reflective surfaces are used to disperse the internally generated beam of light originating from the LEDs. This is of particular advantage in applications where the display is physically small.

Figure 5:
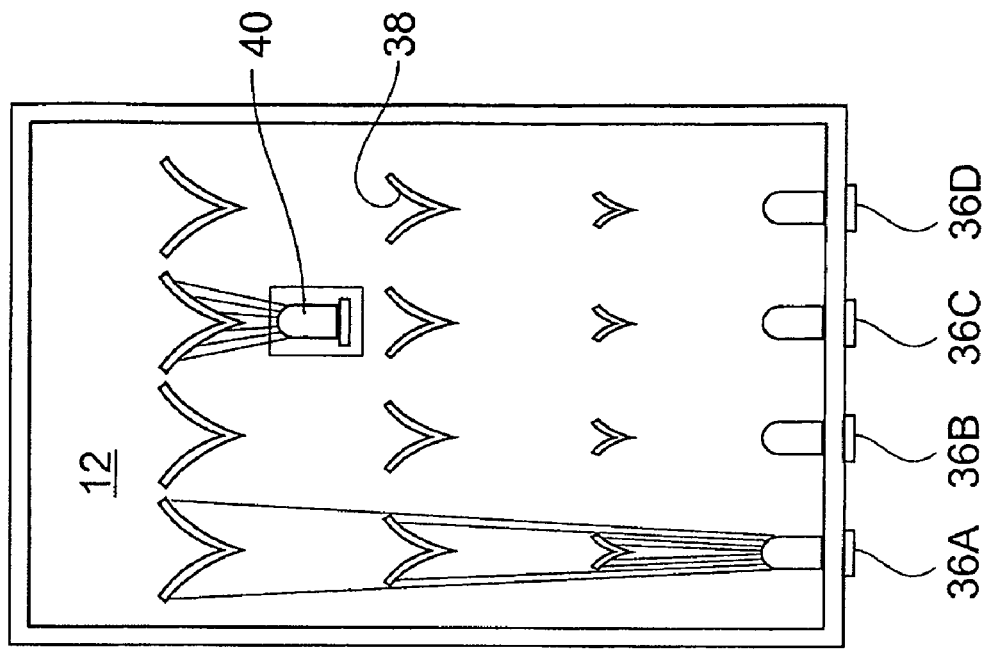
FIG. 5 is a top plan view of a background display apparatus according to a further embodiment of the present invention.

FIG. 5 depicts yet another embodiment of the invention wherein a row of light sources 36A-36D has been incorporated. Where the sheet 12 is large variations in brightness of the light emanating from the upper surface of the panel may be discernible. In that case additional light sources may be placed within the body of the sheet away from its perimeter. For example, in FIG. 5 the shape of the reflective air-gaps approximates a "V" shape when viewed from above as shown. The two halves of each "V" make an angle of approximately 90 degrees to each other and about 135 degrees to a beam from an in-line light source. (For example light source 36D is in-line with air-gap 38). For very large sized panels a light source 40 may be placed within the panel. Light source 40 is covered by a mirror reflector on the upper panel facing towards the light source.

Figure 6:
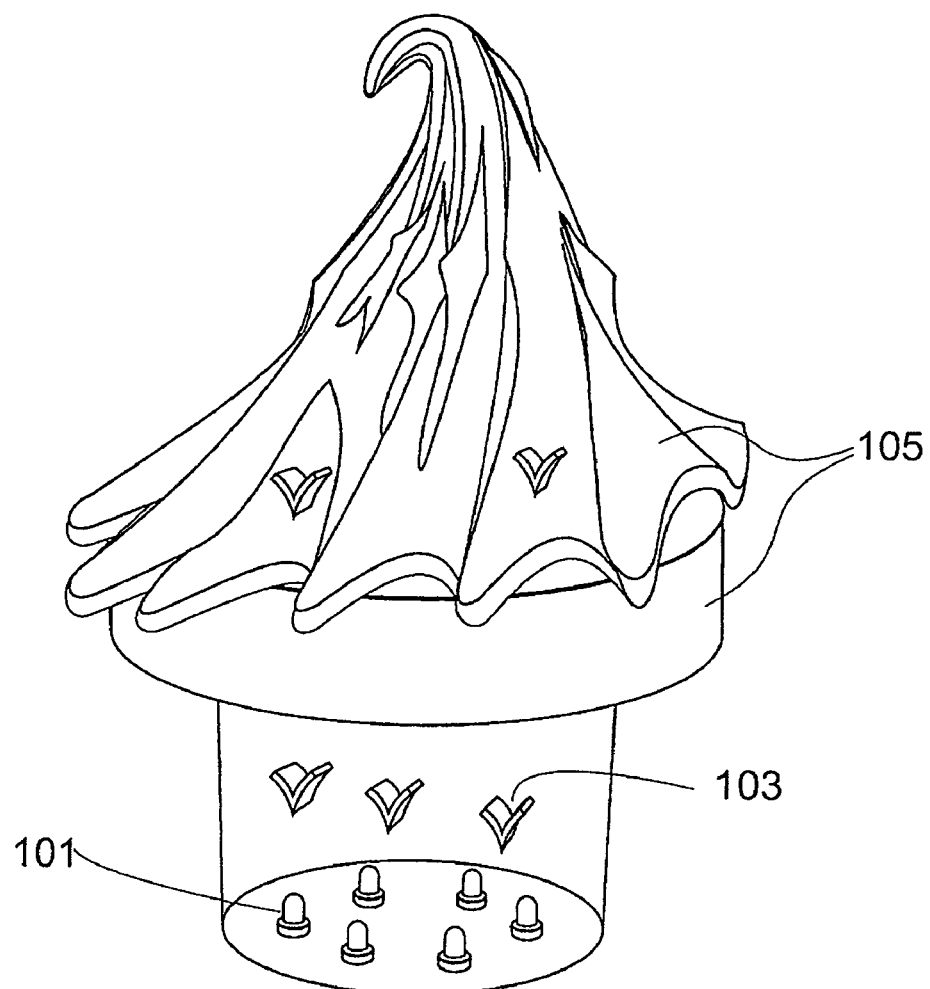
FIG. 6 illustrates a display apparatus according to a further embodiment of the present invention.

While the invention has described with reference to sheets or slabs of optically transparent material, with reference to FIG. 6 an optically transparent substrate of amorphous shape may be employed to produce visually striking displays. In that case the substrate would incorporate a number of light sources 101 and air-gap reflectors to internally reflect light through the body 105 of the substrate. The surface of the substrate may be frosted or otherwise made dispersive in order to disperse light transmitted out through its surface.

With reference to FIG. 2, a translucent sign such as an advertisement may be affixed to the upper surface of slab 12 in order to produce an advertising presentation.

Furthermore, an apparatus according to an embodiment of the present invention may incorporate a sheet 12 that is coloured or multi-coloured. It is also possible to use LEDs of different colours in order to produce further colour effects. In particular, RGB LEDs, being LEDs composed of three primary colours of red, green and blue respectively may be used. A big display may then be created by making a matrix of a multitude of small displays, each in reality being a pixel. This will then create a colour display of billboard size. An advantage of this type of display is the shape of the pixel—square rather than a circle, producing continuous change, rather than the mesh effect caused by the black spots between the circles. Depending on the size of the display, multiple LEDs may be used for each pixel. Fluorescent backing is also preferred to further amplify light, as brightness is important. Using LEDs also gives the option of using solar panels to charge the display.

Another variation is to illuminate a big advertisement with different colours in different sections. Again, these modules can be cut to any size and shape and use as many LEDs as required while allowing sections of the advertisement to change colour with time, flash or simply illuminate different sections with different colours.

It will of course be realised that the above has been given only by way of illustrative example of the invention and that all such modifications and variations thereto as would be apparent to persons skilled in the art are deemed to fall within the broad scope and ambit of the invention as set forth herein in the following claims.

The invention claimed is:

1. An illuminating display including: a transparent substrate in the form of a sheet or slab having an upper face, a lower face and a plurality of edge faces; the plurality of edge faces provided with an internally reflective mirror coating; at least one light source associated with the substrate, causing a narrow beam of light rays to emanate into said substrate, said narrow beam being produced at between 5 and 45 degrees of dispersion; a plurality of reflective surfaces extending from at least one of said edge faces and arranged internally of said substrate to operatively internally reflect light rays from said at least one light source within the substrate, wherein each reflective surface is formed by an air-gap; and at least one of the upper face and the lower face having light capturing material in contact therewith for directing internally reflected light outwardly of the substrate.

2. The illuminating display of claim 1 wherein each reflective surface is perpendicular to either the upper face or the lower face of the substrate.

3. The illuminating display of claim 1, wherein each said air-gap has a further light source located therein to provide further rays of light to emanate with said substrate.

4. The illuminating display of claim 1 wherein the beam of light is directed towards one or more of said plurality of edge faces.

5. The illuminating display of claim 1 wherein the narrow beam is sufficiently narrow such that any light rays incident on either the upper face or the lower face are substantially internally reflected other than where a face is contacted by the light capturing material.

6. The illuminating display of claim 1 wherein the substrate has parallel upper and lower faces.

7. The illuminating display of claim 1 farther comprising white material in contact with the entire lower surface of the substrate for directing light from within the substrate towards the upper surface of the substrate.

8. The illuminating display of claim 1 further comprising white material in contact with selected portions only of the lower surface of the substrate for directing light in a predetermined configuration towards the upper surface of the substrate.

9. The illuminating display of claim 8 wherein the predetermined configuration forms a sign.

10. The illuminating display of claim 1 further comprising a plurality of air-gaps located in said substrate at different positions in order to reflect light rays operatively emanating from said at least one light source over a range of angles.

11. The illuminating display of claim 1 wherein the transparent substrate is selected from clear materials including acrylic, glass and polyethylene.

12. The illuminating display of claim 1 wherein a face of the transparent substrate is treated with a dispersive material.

13. The illuminating display of claim 12 wherein the dispersive material is a translucent film that allows light to be transmitted through it from the transparent substrate.

14. The illuminating display of claim 12 wherein the dispersive material is a micro-grooved coating.

15. The illuminating display of claim 1 wherein the light source is a light emitting diode.

16. The illuminating display of claim 1 wherein the light source is a laser diode.

17. The illuminating display of claim 1 wherein the light source includes optical fibres.

18. The illuminating display of claim 1 wherein at least one reflective surface is substantially flat.

19. The illuminating display of claim 1 wherein at least one reflective surface is curvilinear.

20. The illuminating display of claim 1 wherein at least one reflective surface is parabolically shaped.

21. The illuminating display of claim 1 comprising at least two reflective surfaces arranged to abut each other thereby forming a V cross section.

22. The illuminating display of claim 1 wherein the light source is partially covered by a reflective material in order to prevent viewing of a body of the light source from a point external to the display.

23. An illuminating display of claim 1 in combination with a liquid crystal display (LCD) assembly.

24. The combination of claim 23 wherein substantially the entire lower face of the substrate is in contact with a white material for directing light from within the substrate towards the upper surface of the substrate, which upper surface is associated with the LCD assembly.

25. The illuminating display of claim 1 wherein the narrow beam of light rays is produced at between 8 to 45 degrees of dispersion.

26. The illuminating display of claim 1 wherein the narrow beam of light rays is produced at about 8 degrees of dispersion.

* * * * *